(12) United States Patent
Goebelt et al.

(10) Patent No.: US 7,582,701 B2
(45) Date of Patent: Sep. 1, 2009

(54) STABILIZED UNSATURATED POLYESTER RESIN MIXTURES

(75) Inventors: Bernd Goebelt, Wesel (DE); Gerard Reestman, NZ Weert (NL); Karlheinz Haubennestel, Wesel (DE); Barbel Gertzen, Emmerich (DE); Michael Sommer, Duisburg (DE)

(73) Assignee: BYK-Chemi GmbH (DE)

( * ) Notice: Subject to any disclaimer, the term of this patent is extended or adjusted under 35 U.S.C. 154(b) by 188 days.

(21) Appl. No.: 11/368,070

(22) Filed: Mar. 3, 2006

(65) Prior Publication Data

US 2006/0270795 A1 Nov. 30, 2006

(30) Foreign Application Priority Data

Mar. 4, 2005 (DE) .................. 10 2005 010 548

(51) Int. Cl.
*C08L 53/00* (2006.01)
*C08L 67/00* (2006.01)

(52) U.S. Cl. .................. 525/88; 525/92 R; 525/92 F

(58) Field of Classification Search .................. 525/88, 525/92 R, 92 F
See application file for complete search history.

(56) References Cited

U.S. PATENT DOCUMENTS

| 5,256,709 | A | 10/1993 | Ross et al. | |
|---|---|---|---|---|
| 6,204,319 | B1 * | 3/2001 | Houze et al. | 524/495 |
| 6,255,367 | B1 | 7/2001 | Bitler et al. | |
| 6,413,306 | B1 * | 7/2002 | Kraiter et al. | 106/31.85 |
| 2003/0096111 | A1 * | 5/2003 | Husemann et al. | 428/355 AC |

FOREIGN PATENT DOCUMENTS

| DE | 4402712 A1 | 8/1994 |
|---|---|---|
| EP | 0839166 B1 | 6/2004 |
| EP | 1165690 B1 | 12/2004 |
| WO | WO-0040630 A1 | 7/2000 |
| WO | WO-0144389 A1 | 6/2001 |
| WO | WO-2005/056739 | 6/2005 |

OTHER PUBLICATIONS

Electronic translation of Heckmann, DE 4402712, Aug. 1994.*
Hesse, CAPLUS AN 1995:526586, Abstracting DE 4402712 Aug. 1994.*
"European Search Report for Application No. EP 06 00 4314", 4 Pages.

* cited by examiner

*Primary Examiner*—Jeffrey C Mullis
(74) *Attorney, Agent, or Firm*—Schwegman, Lundberg & Woessner, P.A.

(57) ABSTRACT

The invention relates to an unsaturated polyester resin mixture which can be cured by applying external pressure and which encompasses at least the following components: a) an unsaturated polyester resin whose weight-average molar mass is from 500 to 5000 g/mol; b) an ethylenically unsaturated monomer; c) a shrinkage-reducing component; d) an inert filler; and e) a reinforcing fibre; and f) from 0.01 to 1% by weight of a block copolymer, based on the total weight of the unsaturated polyester resin mixture comprising reinforcing fibre, where the block copolymer encompasses at least one A block and encompasses at least one B block, where the A block contains at least one amine-containing, ethylenically unsaturated monomer; and the B block contains at least one alkyl- and/or phenyl-containing, ethylenically unsaturated monomer, and is free from amine-containing, ethylenically unsaturated monomers. The present invention further relates to a process for preparation of the polyester resin mixtures and to the use of the block copolymers f) in unsaturated polyester resin mixtures.

13 Claims, No Drawings

STABILIZED UNSATURATED POLYESTER RESIN MIXTURES

RELATED APPLICATION

This application claims priority under 35 U.S.C. 119 to German Application No. 10 2005 010 548.3, Filed Mar. 4, 2005, which application is incorporated herein by reference and made a part hereof.

The invention relates to unsaturated polyester resin mixtures stabilized with respect to demixing, to their preparation, and to the use of block copolymers based on ethylenically unsaturated monomers in unsaturated polyester resin mixtures.

Moulding compositions based on unsaturated polyester resin systems are widely used in the form of SMC (sheet moulding compounds), BMC (bulk moulding compounds), DMC (dough moulding compounds), TMC (thick moulding compounds) or LDMC (low density moulding compounds) in production of mouldings. To this end, the resins are treated with inert fillers and with fibrous reinforcing materials. When the mouldings are compressed, the resin hardens via polymerization. In this process, the unsaturated polyester resin bonds to unsaturated monomers present in the formulation, for example styrene or divinylbenzene. The hardening process is generally a free-radical process and is initiated by an added free-radical initiator which is activated via the rise in temperature during the compression procedure. The reinforcing fibres and the fillers, and also the pigments, are present homogeneously distributed in this polymeric matrix.

During the polymerization process, shrinkage of the parts takes place. In order to counter this shrinkage, shrinkage-reducing components known as LS additives (low-shrink additives) or LP additives (low-profile additives) are added to the mixture. These shrinkage-reducing components are mostly thermoplastics, such as polystyrenes or polyacrylates. Thickeners from the group of the metal oxides or metal hydroxides of the first to third main group of the Periodic Table of the Elements are mostly added to the mixture in order that viscosity of the resin formulation allows it to be handled during the compression procedure. The viscosity of the mixture rises in an "ageing process", until the consistency of the composition is cuttable but still mouldable. Depending on the application, other additives, such as release agents, are added to the unsaturated polyester resin mixtures.

The individual components in unsaturated polyester resin systems do not form a stable mixture with one another. However, in order to produce a homogeneous moulding, the properties of whose material remain the same throughout the entire volume, all of the components have to be present in a stable, homogeneous mixture during the compression procedure. However, a stable and homogeneous mixture of all of the components in the unsaturated polyester resin systems is also essential during storage of the premix in its thickened or non-thickened form.

U.S. Pat. No. 3,836,600 describes the compatibilizing effect of block copolymers which contain a polyethylene oxide block and contain a block which contains ethylenically unsaturated, aromatic monomers and/or conjugated diene monomers, in curable plastics mixtures, such as unsaturated polyester resin mixtures.

U.S. Pat. No. 3,887,515 describes the viscosity-reducing effect of polyalkylene-oxide-containing block copolymers in unsaturated polyester resin mixtures.

U.S. Pat. No. 3,988,388 discloses the use of ethylene-vinyl acetate copolymers with from 60 to 99% of vinyl acetate content, polyacrylates having long-chain alkyl groups, and cellulose derivatives for dispersion of shrinkage-reducing components of the ethylene-vinyl acetate or ethylene-vinyl propionate copolymer class.

U.S. Pat. Nos. 4,491,642 and 4,555,534 describe the use of surfactant substances, such as silicones or polyethers in combination with vinyl acetate-maleic anhydride polymers as shrinkage-reducing component for more uniform colouring of SMCs and BMCs with pigments.

U.S. Pat. Nos. 5,162,401 and 5,256,709 describe polyethers and, respectively, aromatic hydrocarbons which are compatible with the unsaturated polyester and with the monomer not only in the cold mixture but also during the hardening procedure, in unsaturated polyester resin mixtures, for improvement of surface smoothness, specifically in SMC parts.

The disadvantage of the compounds hitherto described is the restricted compatibility with respect to certain components, e.g. with respect to certain shrinkage-reducing components or certain fillers in unsaturated polyester resin systems. For universal applicability, however, broadly based compatibility of the additive in the unsaturated polyester resin systems is needed.

The object of this invention is provision of a homogeneous, unsaturated polyester resin mixture which comprises reinforcing fibre and is intended for pressure-curing moulding compositions, and which comprises less mixture-stabilizing additives than the prior art, and where the mixture-stabilizing additives provide broadly based compatibility. In particular, the viscosity of the unsaturated polyester resin mixture is not to be reduced, because viscosity reduction promotes demixing of the polyester resin mixture.

The object of the invention is achieved via provision of an unsaturated polyester resin mixture which can be cured by applying external pressure and which encompasses at least the following components:

a) an unsaturated polyester resin whose weight-average molar mass is from 500 to 5000 g/mol;
b) an ethylenically unsaturated monomer;
c) a shrinkage-reducing component;
d) an inert filler; and
e) a reinforcing fibre; and
f) from 0.01 to 1% by weight of a block copolymer, based on the total weight of the unsaturated polyester resin mixture comprising reinforcing fibre, where the block copolymer encompasses at least one A block and encompasses at least one B block, where the
   A block contains at least one amine-containing, ethylenically unsaturated monomer incorporated by polymerization into the polymer; and the
   B block contains at least one alkyl- and/or phenyl-containing, ethylenically unsaturated monomer incorporated by polymerization into the polymer, and is free from amine-containing, ethylenically unsaturated monomers incorporated by polymerization into the polymer.

In general, any of the conventional unsaturated polyester resins (UP resins) can serve as unsaturated polyester resin of component a). Any of the commercially available UP resins is in essence suitable. In particular, UP resins can be prepared from dibasic carboxylic acids and carboxylic anhydrides, of which at least one compound has to be unsaturated, and from dihydric alcohols and epoxides.

Examples of dibasic unsaturated carboxylic acids and carboxylic acid derivatives are maleic acid, fumaric acid, phthalic acid, isophthalic acid, terephthalic acid and HET acid (hexachloroendomethylenetetrahydrophthalic acid), and also the anhydrides of the carboxylic acids mentioned. However, adipic acid and glutaric acid, or Diels-Alder adducts composed of maleic anhydride and cyclopentadiene can also be used as dibasic carboxylic acid component. Concomitant use can also be made of acrylic acid and methacrylic acid during preparation of UP resins.

A dihydric alcohol component that can in particular be used is propylene, dipropylene, ethylene, diethylene, or neopentyl glycol, or else 1,4-butanediol and 2,2,4-trimethylpentane-1,3-diol. An example of another compound that can be used is the diglycidyl ether of tetrabromobisphenol.

Alongside the dibasic carboxylic acids and dihydric alcohols, it is possible to use alcohols and carboxylic acids of higher functionality, giving branched polycondensates.

The ethylenically unsaturated monomers of component b) react with the double bonds of the polyester chains by a free-radical polymerization mechanism and thus give crosslinking, i.e. curing of the products.

If the ethylenically unsaturated monomers b) are electronegative comonomers, such as styrene or vinyl acetate, the product can by way of example be "alternating" copolymers. These are copolymers which have relatively short crosslinking bridges and thus give relatively hard thermosets. Comonomers which are more electropositive, e.g. methyl methacrylate, in contrast tend to form relatively long methyl methacrylate blocks between the polyester chains, and give corresponding softer thermosets. Specific resins can also comprise vinyltoluene, α-methylstyrene or diallyl phthalate, for example, as component b).

The shrinkage-reducing components c) used in this context in particular comprise the compounds termed LS additives or LP additives in the literature. Among these are, by way of example, polyethylenes and their copolymers, polystyrenes and their copolymers, saturated polyesters, cellulose acetobutyrate, polyacrylates, such as polymethyl methacrylate, polyvinyl acetates and their copolymers, styrenebutadiene copolymers and mixtures of these polymers.

Examples of suitable inert fillers d) are naturally occurring and synthetic chalk ($CaCO_3$), aluminum trihydrate (ATH), kaolin, talc, feldspat, metal oxides, powdered quartz and rock flour.

Examples of reinforcing fibres e) are glass fibres, in particular those composed of low-alkali borosilicate glass, synthetic organic fibres (e.g. polyesters, polyamides, aramids), carbon fibres and naturally occurring organic fibres (e.g. cellulose).

The inventive unsaturated polyester resin mixtures which cure under pressure can moreover comprise other components.

Among these are by way of example processing additives, such as release agents and antifoams, stabilizers, such as antioxidants, light stabilizers, heat stabilizers and flame retardants, bulk modifiers, such as adhesion promoters, wetting agents, plasticizers, thickeners, impact modifiers and blowing agents, and also surface modifiers, such as antistatic agents. There is absolutely no restriction on the selection of these additives, and they are selected in a known manner as a function of the intended use.

The inventive polyester resin mixtures can moreover, if desired, also comprise organic and inorganic pigments or dyes.

Block copolymers are described in WO 01/44389 as wetting and dispersing agents for aqueous pigment-containing preparations. WO 00/40630 claims the use of the same polymer structures for production of pigment preparations which are suitable for formulation of pigmented coating compositions or inks. Both specifications describe the dispersion of pigments with block copolymers, also in the presence of typical paint binders based on polyester resins. The viscosity of the pigment preparation is lowered here.

In the case of the inventive unsaturated polyester resin mixtures, no viscosity-lowering effect is observed in the inventive unsaturated polyester resin mixtures with the amounts of the block copolymers. Nor is the lowering of viscosity desirable, because lower viscosity of the unsaturated polyester resin mixture accelerates separation.

The block copolymers f) used in the unsaturated polyester resin mixtures are preferably prepared by processes involving controlled living polymerization. Examples of these polymerization processes are known to a person of average skill in the art and are described inter alia in the following articles and patent specifications:

1) "Reversible Addition Fragmentation Chain Transfer Process" (RAFT) as described by way of example in *Polym. Int.* 2000, 49, 993, U.S. Pat. No. 6,291,620, WO 98/01478, WO 98/58974 and WO 99/31144.
2) Controlled polymerization with nitroxyl compounds as polymerization regulators (NMP), as described by way of example in *Chem. Rev.* 2001, 101, 3661. 3) "Atom Transfer Radical Polymerization" (ATRP), as described by way of example in *Chem. Rev.* 2001, 101, 2921.
4) "Group Transfer Polymerization" (GTP), as described by way of example by O. W. Webster in "Group Transfer Polymerization", in "Encyclopedia of Polymer Science and Engineering", volume 7, H. F. Mark, N. M. Bikales, C. G. Overberger and G. Menges, Eds., Wiley Interscience, New York 1987, pp. 580 et seq.

Suitable reaction conditions, monomers and solvents known to a person of average skill in the art are to be selected as a function of polymerization method.

According to the invention, the copolymers used as block copolymers are characterized by a sharp transition in monomer constitution along the polymer chain, defining the boundary between the individual blocks. This sharp transition in monomer constitution is achieved in the abovementioned process involving controlled living polymerization via sequential addition of the monomers or monomer mixtures.

In order to qualify as a block of a block copolymer, a block has to be composed of at least three monomer units. The blocks themselves can have a structure, such as a random structure, an alternating structure, a block structure, or a gradient structure.

The number-average molar mass of the block copolymers is preferably from 1000 g/mol to 200 000 g/mol, particularly preferably from 2000 g/mol to 50 000 g/mol and very particularly preferably from 2000 g/mol to 20 000 g/mol.

Preferred examples of block copolymer structures are AB or BA diblock copolymers, ABA or BAB triblock copolymers, or triblock copolymers which can contain, alongside at least one A block and at least one B block, one or more other blocks (C blocks), where this block does not fall within the definition of the A block or within the definition of the B block. In the case of the ABA and BAB triblock copolymers, the two A blocks in the first case and respectively the two B blocks in the second case can have different structures independently of one another, as long as they comply with the above definitions. By way of example, therefore, the first B block of a BAB triblock copolymer can differ with respect to length and/or monomer constitution from the second B block on the other side of the A block. However, among the above structures particular preference is given to the diblock structures.

Each A block of the block copolymer f) present in the inventive polyester resin mixture preferably contains at least 10% by weight, particularly preferably at least 25% by weight, and more preferably at least 50% by weight, of one or more amine-containing ethylenically unsaturated monomers incorporated by polymerization, based on the total weight of the said A block.

Examples of ethylenically unsaturated monomers which contain amine groups are mentioned below (the term (meth) acrylate here and in the entire specification including both acrylates and methacrylates): aminoalkyl (meth)acrylates and aminoalkyl(meth)acrylamides, e.g. N,N-dimethylaminoethyl (meth)acrylate, N,N-dimethylaminopropyl (meth)acrylate, N,N-dimethylaminopropyl(meth)acrylamide and 2-butylaminoethyl methacrylate; or ethylenically unsaturated N heterocycles which can form salts with acids, e.g. 2-vinylpyridine, 4-vinylpyridine and vinylimidazole.

Each B block of the block copolymer f) present in the inventive polyester resin mixture preferably contains at least 25% by weight, more preferably at least 50% by weight, and particularly preferably 100% by weight, of at least one alkyl- and/or phenyl-containing, ethylenically unsaturated monomer incorporated by polymerization, based on the total weight of the respective B block. The monomers which characterize the B block can moreover also be present in the A block.

Examples of ethylenically unsaturated monomers which contain phenyl groups are aryl (meth)acrylates, such as benzyl methacrylate or phenyl acrylate, where the aryl radicals in each case are unsubstituted or may have up to five substituents, an example being 4-nitrophenyl methacrylate; or styrene and substituted styrenes, e.g. 4-methylstyrene, 4-vinylbenzoic acid and sodium 4-vinylbenzenesulphonate.

Examples of ethylenically unsaturated monomers which contain alkyl groups are the following: alkyl (meth)acrylates of straight-chain, branched or cycloaliphatic alcohols having from 1 to 22 carbon atoms, examples being methyl (meth)acrylate, ethyl (meth)acrylate, n-butyl (meth)acrylate, isobutyl (meth)acrylate, tert-butyl (meth)acrylate, lauryl (meth)acrylate, 2-ethylhexyl (meth)acrylate, stearyl (meth)acrylate, cyclohexyl (meth)acrylate, isobornyl (meth)acrylate and tert-butyl (meth)acrylate.

Other monomers can be constituents of the optional C blocks and can be freely selected among the ethylenically unsaturated monomers which do not fall within the definitions of the monomers of the A or B blocks. However, these monomers can also be present in the A block and/or B block.

Examples of these ethylenically unsaturated monomers are inter alia: hydroxyalkyl (meth)acrylates of straight-chain, branched or cycloaliphatic diols having from 2 to 36 carbon atoms, e.g. 3-hydroxypropyl methacrylate, 3,4-dihydroxybutyl methacrylate, 2-hydroxyethyl (meth) acrylate, 4-hydroxybutyl (meth)acrylate, 2-hydroxypropyl methacrylate; (meth) acrylates of ethers, of polyethylene glycols, of polypropylene glycols or of mixed poly(ethylene/propylene) glycols having from 5 to 80 carbon atoms, e.g. tetrahydrofurfuryl methacrylate, vinyloxyethoxyethyl methacrylate, methoxyethoxyethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, poly(ethylene glycol) methyl ether (meth)acrylate and poly(propylene glycol) methyl ether (meth)acrylate; caprolactone and/or valerolactone-modified hydroxyalkyl (meth)acrylates having an average molecular weight $M_n$ of from 220 to 1200, where the hydroxy (meth)acrylates preferably derive from straight-chain, branched or cycloaliphatic diols having from 2 to 8 carbon atoms; and methacrylonitrile and acrylonitrile.

Another object of the present invention consisted in providing the inventive unsaturated polyester resin mixture for moulding compositions which can be cured under pressure with mixture-stabilizing additives which can be incorporated into the polymeric matrix during hardening of the unsaturated polyester resin and thus inhibit occurrence of undesired effects, such as exudation of the additive.

This object is in particular achieved in that the block copolymers f) are prepared by way of example by means of the abovementioned NMP or RAFT technologies, in which the polymerization regulator used during the preparation process remains on the block copolymer chain end. During hardening of the resin it is therefore possible for chain extension of the block copolymer to take place, so that the block copolymer becomes incorporated into the polymeric matrix of the unsaturated polyester resin, and this inhibits subsequent exudation of the block copolymer.

Examples of polymerization regulators for NMP are 2,2, 6,6-tetramethylpiperidinoxyl (TEMPO) and N-tert-butyl-N-[1-diethylphosphono(2,2-dimethylpropyl)]nitroxyl.

Examples of polymerization regulators for RAFT are thiocarboxylic esters or xanthogenic esters. Other examples are disclosed in the literature listed above and are known to a person of average skill in the art.

In one particular embodiment, components a)-d) and of the block copolymer f) are mixed with one another. The requirement placed upon this mixture is that it remains in essence homogeneous during storage and does not separate. The further component e) and the thickener are usually not added until a subsequent juncture, and the entire mixture is usually homogenized before it is pressed to give mouldings, whereupon the resin mixture polymerizes during the compression procedure, in essence without demixing of the components.

The monographs: J. H. Aurer and A. Kasper "Unsaturated Polyester Resins", 2003, Verlag Moderne Industrie and Hamid G. Kia "Sheet Molding Compounds Science and Technology", 1993, Hanser Publishers, Munich describe the processing of unsaturated polyester resin mixtures and describe other examples of unsaturated polyester resins, of shrinkage-reducing components, of reinforcing fibres, and of inert fillers or additives, and their use.

Preparation of Example Polymers

COMPARATIVE EXAMPLE 1

Random Copolymer 14.5 g of Pluriol P 600 polypropylene glycol (BASF) is heated to 120° C. under nitrogen in a three-necked flask with stirrer with precision glass gland and reflux condenser. Within a period of 120 min, a mixture composed of 12 g of styrene, 22 g of n-butyl acrylate, 15 g of N,N-dimethylaminoethyl methacrylate and 0.5 g of 2,2'-azobis(isobutyronitrile) is fed into the flask. After one further hour, the conversion achieved is 98%. Further Pluriol P 600 polypropylene glycol is then used to adjust the polymer to 52% content.

BA block Copolymers

Polymer 1

14.5 g of Pluriol P 600 polypropylene glycol (BASF), 12 g of styrene, 22 g of n-butyl acrylate, 1 g of SG1 (=N-tert-butyl-N-[1-diethylphosphono(2,2-dimethylpropyl)]nitroxyl;

preparation see Macromolecules 2000, 33, 1141) and 0.35 g of 2,2'-azobis(isobutyronitrile) are heated to 120° C. under nitrogen in a three-necked flask with stirrer with precision glass gland and reflux condenser. The conversion achieved after about 3 hours is 90%. 15 g of N,N-dimethylaminoethyl methacrylate are then added, and polymerization is continued for a further 5 h to conversion above 95%. Further Pluriol P 600 polypropylene glycol is then used to adjust the polymer to 52% content.

Polymer 2

14.5 g of Pluriol P 600 polypropylene glycol (BASF), 35 g of n-butyl acrylate, 1 g of SG1 and 0.35 g of 2,2'-azobis (isobutyronitrile) are heated to 120° C. under nitrogen in a three-necked flask with stirrer with precision glass gland and reflux condenser. The conversion achieved after about 3 hours is 90%. 15 g of N,N-dimethylaminoethyl methacrylate are then added, and polymerization is continued for a further 5 h to conversion above 95%. Further Pluriol P 600 polypropylene glycol is then used to adjust the polymer to 52% content.

BAB Block Copolymers

Polymer 3

14.5 g of Pluriol P 600 polypropylene glycol, 6 g of styrene, 11 g of n-butyl acrylate, 1 g of SG1 and 0.35 g of 2,2'-azobis (isobutyronitrile) are heated to 120° C. under nitrogen in a three-necked flask with stirrer with precision glass gland and reflux condenser. The conversion achieved after about 3 hours is 95%. 15 g of N,N-dimethylaminoethyl methacrylate are then added and polymerization is continued for a further 4 h at a temperature of 100° C. to conversion above 95%. After addition of a further 6 g of styrene and 11 g of n-butyl acrylate, the mixture is polymerized to conversion greater than 95% at 120° C. (about 10 hours). Further Pluriol P 600 polypropylene glycol is then used to adjust the polymer to 52% content.

Polymer 4

14.5 g of Pluriol P 600 polypropylene glycol, 17 g of n-butyl acrylate, 1 g of SG1 and 0.35 g of 2,2'-azobis(isobutyronitrile) are heated to 120° C. under nitrogen in a three-necked flask with stirrer with precision glass gland and reflux condenser. The conversion achieved after about 3 hours is 95%. 15 g of N,N-dimethylaminoethyl methacrylate are then added and polymerization is continued for a further 4 h at a temperature of 100° C. to conversion above 95%. After addition of a further 17 g of n-butyl acrylate, the mixture is polymerized to conversion greater than 95% at 120° C. (about 10 hours). Further Pluriol P 600 polypropylene glycol is then used to adjust the polymer to 52% content.

Polymer 5

14.5 g of Pluriol P 600 polypropylene glycol, 6 g of styrene, 11 g of n-butyl acrylate, 1 g of SG1 and 0.35 g of 2,2'-azobis (isobutyronitrile) are heated to 120° C. under nitrogen in a three-necked flask with stirrer with precision glass gland and reflux condenser. The conversion achieved after about 3 hours is 95%. 15 g of N,N-dimethylaminoethyl methacrylate are then added and polymerization is continued for a further 4 h at a temperature of 100° C. to conversion above 95%. After addition of 17 g of n-butyl acrylate, the mixture is polymerized to conversion greater than 95% at 120° C. (about 10 hours). Further Pluriol P 600 polypropylene glycol is then used to adjust the polymer to 52% content.

Application-related Examples

Test of Homogeneity of Unsaturated Polyester Resin Mixture A

| | | Formulation | |
|---|---|---|---|
| 1 | Up resin | 70.0 g | Palapreg P 17-02 (BASF) |
| 2 | LS additive | 30.0 g | Palapreg H 814-01 (BASF) |
| 3 | Polymer | see Table 1 | Comparative Example 1 and polymers 1-5 |
| 4 | $CaCO_3$ | 150.0 g | Millicarb (Omya) |
| 5 | Pigment | 0.5 g | Cobalt blue |
| 6 | Reinforcing fibre | 25 g | Glass fibre OC R07 4800 tex, glass content: 97 parts by weight (Owens Corning) chopped (length 6-50 mm) |

UP resin: unsaturated polyester resin, in styrene
LS additive: low-shrink additive (shrinkage-reducing component)
Palapreg P 17-02: unsaturated polyester resin in styrene
Palapreg H 814-01: polystyrene solvated in styrene Preparation and Assessment of Unsaturated Polyester Resin Mixture:

Components 1-5 are added in the formulation sequence and manually mixed, and then homogenized. Component 6 is then incorporated by stirring. The mixture is charged to a 100 ml beaded-edge glass vessel with snap lid and stored at room temperature. After 24 hours the specimens are visually assessed for homogeneity.

TABLE 1

| Polymer | Amount of polymer | Homogeneity assessment |
|---|---|---|
| Zero specimen (no polymer) | | marked separation |
| Comparative Example 1 | 1 g | marked separation |
| Polymer 1 | 0.5 g | no separation |
| Polymer 2 | 0.5 g | no separation |
| Polymer 3 | 0.5 g | no separation |
| Polymer 4 | 0.5 g | no separation |
| Polymer 5 | 0.5 g | no separation |

Viscosity reduction is not observed in any of the examples using polymers 1-5.

The pigment cobalt blue permits better assessment of the homogeneity of the unsaturated polyester resin mixture, but is not usually used in practice.

A random copolymer is selected as Comparative Example 1 in order to permit assessment of the significance of the block-type structure of the inventive polymers with respect to mixture-stabilizing action.

The results of the application-related examples presented in Table 1 show that when the block copolymers "Polymer 1" to "Polymer 5" are used it is possible to obtain significantly better mixture-stabilizing action in the unsaturated polyester resin mixtures than with the comparable, random-structure polymer of Comparative Example 1.

Test Formulation SMC Electrogrey—RAL 7032

The SMC formulation stated in Table 2 was prepared by first homogenizing all of the liquid constituents by means of a dissolver and then mixing to incorporate all of the solids.

TABLE 2

| Usage example | Amount in parts by weight |
|---|---|
| Resin 1 Palapreg P17-02 Standard glycol-phthalic acid resin (35% strength in styrene) | 70.00 |
| Resin 2 Palapreg H 814-01 Polystyrene (33% strength in styrene) | 30.00 |
| Pigment paste in monomer-free polyester resin, Brohl Chemie, Electrogrey RAL 7032 - 65 l (qv) | 10.00 |
| tert-Butyl peroxybenzoate Hardener (Trigonox C from Akzo) | 1.50 |
| 2,6-Di-tert-butyl-4-methylphenol Inhibitor (Ionol CP) | 0.10 |
| Filler 1 Chalk (Millicarb OG) | 50.00 |
| Filler 2 Al(OH)$_3$ (Martinal ON 921) | 120.00 |
| PE powder Coathylene HA 1681 | 5.00 |
| Luvatol MK 35 NV (35% strength MgO in monomer-free UP resin) | 2.00 |
| Polymer 1 | 0.50 |

SMC prepregs were produced from the formulation on a laboratory SMC plant from Schmidt and Heinzmann, by applying the resin composition between two polyamide 10 carrier foils (belt speed: 5.5 m/min; doctor gap: 1.6 mm; weight per unit area: 4000 g/m$^2$; glass type used: OC R07 4800 tex from Owens Corning; glass content: 97 parts by weight, corresponding to 25% by weight based on the entire formulation).

After a storage time of 5 days at room temperature, the thickened-consistency SMC prepreg was cut to give 860 g pieces, the carrier foil was peeled away, and appearance was evaluated.

Homogeneity Test on SMC After Pressing

The SMC pieces freed from the carrier foil were pressed to give test sheets, using a mould design factor of 40%. The temperature used here was from 150 to 155° C., the press time was 180 s and the ram pressure was 1200 kN. The finished pressed sheets were then visually assessed for homogeneity and surface quality. To evaluate surface quality, the sheet to be tested was held slightly obliquely with respect to the window, together with a comparison sheet. The clarity with which the specimen surface could reflect objects was evaluated.

The SMC sheet manufactured in the usage example exhibits the desired homogeneity, i.e. a glossy surface without any marble effect. Demixing of the components of the unsaturated polyester resin mixture during the compression procedure would produce a dull SMC surface with a marble effect.

The invention claimed is:

1. An unsaturated polyester resin mixture which can be cured by applying external pressure and which comprises at least the following components:
   a) an unsaturated polyester resin whose weight-average molar mass is from 500 to 5000 g/mol;
   b) an ethylenically unsaturated monomer;
   c) a shrinkage-reducing component;
   d) an inert filler; and
   e) a reinforcing fibre; and
   f) from 0.01 to 1% by weight of a block copolymer, based on the total weight of the unsaturated polyester resin mixture,
   wherein the block copolymer comprises at least one A block and comprises at least one B block, wherein the A block contains at least one amine-containing, ethylenically unsaturated monomer incorporated by polymerization into the polymer; and the B block contains at least one alkyl- and/or phenyl-containing, ethylenically unsaturated monomer incorporated by polymerization into the polymer, and is free from amine-containing, ethylenically unsaturated monomers incorporated by polymerization into the polymer.

2. A polyester resin mixture according to claim 1, wherein the block copolymer f) has been prepared by means of NMP or RAFT.

3. A polyester resin mixture according to claim 1 wherein the block copolymer f) has, at the polymer chain end, a polymerization regulator which is reactive toward the unsaturated polyester resin a) and/or toward the ethylenically unsaturated monomer b).

4. A polyester resin mixture according to claim 1, wherein block A comprises one or more monomers selected from the group consisting of aminoalkyl (meth)acrylates, aminoalkyl (meth)acrylamides and ethylenically unsaturated nitrogen-containing heterocycles which can form salts with acids; and block B comprises one or more monomers selected from the group consisting of aryl (meth)acrylates, styrene, substituted styrenes, and alkyl (meth)acrylates of straight-chain, branched or cycloaliphatic alcohols having from 1 to 22 carbon atoms.

5. A polyester resin mixture according to claim 1, wherein the amine-containing ethylenically unsaturated monomer(s) of the A block is/are present at least in a proportion of 10% by weight, based on the total weight of the A block, in the said A block.

6. A polyester resin mixture according to claim 1, wherein the alkyl- and/or phenyl-containing, ethylenically unsaturated monomer(s) of the B block is/are present at least in a proportion of 25% by weight, based on the total weight of the B block, in the said B block.

7. A polyester resin mixture according to claim 1, where the block copolymer f) is an AB, BA, ABA or BAB block copolymer.

8. A polyester resin mixture according to claim 7, where the block copolymer is a diblock copolymer.

9. A polyester resin mixture according to claim 1, which has been subjected to a curing process.

10. A process for preparation of an unsaturated polyester resin mixture of reinforcing fibre, comprising first mixing components
   a) an unsaturated polyester resin whose weight-average molar mass is from 500 to 5000 g/mol;
   b) an ethylenically unsaturated monomer;
   c) a shrinkage-reducing component;
   d) an inert filler; and
   f) from 0.01 to 1% by weight of a block copolymer, based on the total weight of the unsaturated polyester resin mixture,
   wherein the block copolymer comprises at least one A block and comprises at least one B block, wherein the A block contains at least one amine-containing, ethylenically unsaturated monomer incorporated by polymerization into the polymer; and the B block contains at least one alkyl- and/or phenyl-containing, ethylenically unsaturated monomer incorporated by polymerization into the polymer, and is free from amine-containing, ethylenically unsaturated monomers incorporated by polymerization into the polymer to form an intermediate mixture and then adding e) a reinforcing fibre to the intermediate mixture to form the unsaturated polyester resin mixture.

11. A process according to claim 10 further comprising curing the unsaturated polyester resin mixture by applying external pressure.

12. A polyester resin mixture according to claim 1 in which the block copolymer f) has been prepared by means of NMP or RAFT, and/or exerts no viscosity-lowering effect on the unsaturated polyester resin mixture.

13. A moulding composition comprising a cured polyester resin mixture of claim 1.

* * * * *

UNITED STATES PATENT AND TRADEMARK OFFICE
CERTIFICATE OF CORRECTION

PATENT NO. : 7,582,701 B2 Page 1 of 1
APPLICATION NO. : 11/368070
DATED : September 1, 2009
INVENTOR(S) : Goebelt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 230 days.

Signed and Sealed this

Fourteenth Day of September, 2010

David J. Kappos
*Director of the United States Patent and Trademark Office*